(12) United States Patent
Zhou et al.

(10) Patent No.: US 10,367,648 B2
(45) Date of Patent: Jul. 30, 2019

(54) MULTICAST FORWARDING TABLE ENTRY IN AN OVERLAY NETWORK

(71) Applicant: HANGZHOU H3C TECHNOLOGIES CO., LTD., Zhejiang (CN)

(72) Inventors: Xulong Zhou, Beijing (CN); Ce Sun, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/314,756

(22) PCT Filed: May 26, 2015

(86) PCT No.: PCT/CN2015/079767
§ 371 (c)(1),
(2) Date: Nov. 29, 2016

(87) PCT Pub. No.: WO2015/180617
PCT Pub. Date: Dec. 3, 2015

(65) Prior Publication Data
US 2017/0195127 A1    Jul. 6, 2017

(30) Foreign Application Priority Data
May 29, 2014 (CN) .......................... 2014 1 0239410

(51) Int. Cl.
*H04L 12/18* (2006.01)
*H04L 12/46* (2006.01)
*H04L 12/64* (2006.01)

(52) U.S. Cl.
CPC .......... *H04L 12/18* (2013.01); *H04L 12/4641* (2013.01); *H04L 12/6418* (2013.01)

(58) Field of Classification Search
CPC .......................... H04L 12/18; H04L 12/4641
See application file for complete search history.

(56) References Cited

U.S. PATENT DOCUMENTS 6,456,597 B1 * 9/2002 Bare ................. H04L 29/12009
370/252
6,457,059 B1 * 9/2002 Kobayashi ............ H04L 12/185
709/242
(Continued)

FOREIGN PATENT DOCUMENTS

CN    101453399 A    6/2009
CN    102045250 A    5/2011
(Continued)

OTHER PUBLICATIONS

International Search Report and Written Opinion, International Application No. PCT/CN2015/079767, dated Sep. 2, 2015, pp. 1-7, SIPO.
(Continued)

*Primary Examiner* — Rasheed Gidado
(74) *Attorney, Agent, or Firm* — Hewlett Packard Enterprise Patent Department

(57) ABSTRACT

An edge router (ED) receives a query packet for a multicast group and records a port that received the query packet into at least one list in a multicast forwarding table entry corresponding to the multicast group. The ED removes a forwarding flag in the query packet and sends the modified query packet through all of overlay tunnel ports, except an overlay tunnel port that received the query packet.

8 Claims, 4 Drawing Sheets

(56) References Cited

U.S. PATENT DOCUMENTS

| | | | | |
|---|---|---|---|---|
| 8,045,487 | B2* | 10/2011 | Luo | H04L 12/185 |
| | | | | 370/256 |
| 8,526,427 | B1* | 9/2013 | Smith | H04L 12/4641 |
| | | | | 370/389 |
| 9,313,118 | B2* | 4/2016 | Song | H04L 43/028 |
| 9,391,886 | B2* | 7/2016 | Roper | H04L 45/70 |
| 9,531,598 | B2* | 12/2016 | Roper | H04L 45/745 |
| 2007/0091890 | A1 | 4/2007 | Radhakrishnan et al. | |
| 2015/0244617 | A1* | 8/2015 | Nakil | G06F 9/45558 |
| | | | | 709/224 |
| 2015/0256576 | A1* | 9/2015 | Yang | H04L 12/184 |
| | | | | 370/390 |

FOREIGN PATENT DOCUMENTS

| | | |
|---|---|---|
| CN | 102291289 A | 12/2011 |
| CN | 102291307 A | 12/2011 |
| CN | 102594711 A | 7/2012 |
| CN | 103491012 A | 1/2014 |
| CN | 103685006 A | 3/2014 |

OTHER PUBLICATIONS

Hangzhou H3C Technologies Co., Ltd., "Rationale of EVI technology (II)" and English translation thereof, May 15, 2013, 15 pages.

\* cited by examiner

MULTICAST FORWARDING TABLE ENTRY IN AN OVERLAY NETWORK

BACKGROUND

Overlay networks may be used to establish layer-2 links between remote sites over a layer-3 network. Ethernet Virtual Interconnection (EVI) is one example of an overlay technology that can implement exchange of layer-2 VLAN traffic between two sites. Other examples include, but are not limited to, Virtual extensible Local Area Network (VX-LAN), Ethernet Virtual Network (EVN) and Overlay Transport Network (OTV).

An overlay network includes a plurality of site networks (also referred to as sites) and a core network. Edge devices (ED) of the sites are connected to the core network. Packets from a site are mapped and forwarded to remote sites through overlay tunnels established between the core network to the remote sites. In EVI the overlay tunnel is a generic routing encapsulation (GRE) tunnel. A GRE tunnel can bear multiple EVI links.

in an overlay network, according to a split horizon function, packets received from a port of an overlay tunnel (which is simply referred to as an overlay tunnel port) are forwarded within the site, but will not be forwarded through another overlay tunnel port. This split horizon function is used to avoid forming forwarding loops among multiple EDs in the overlay network.

DETAILED DESCRIPTIONS

Figure 1:
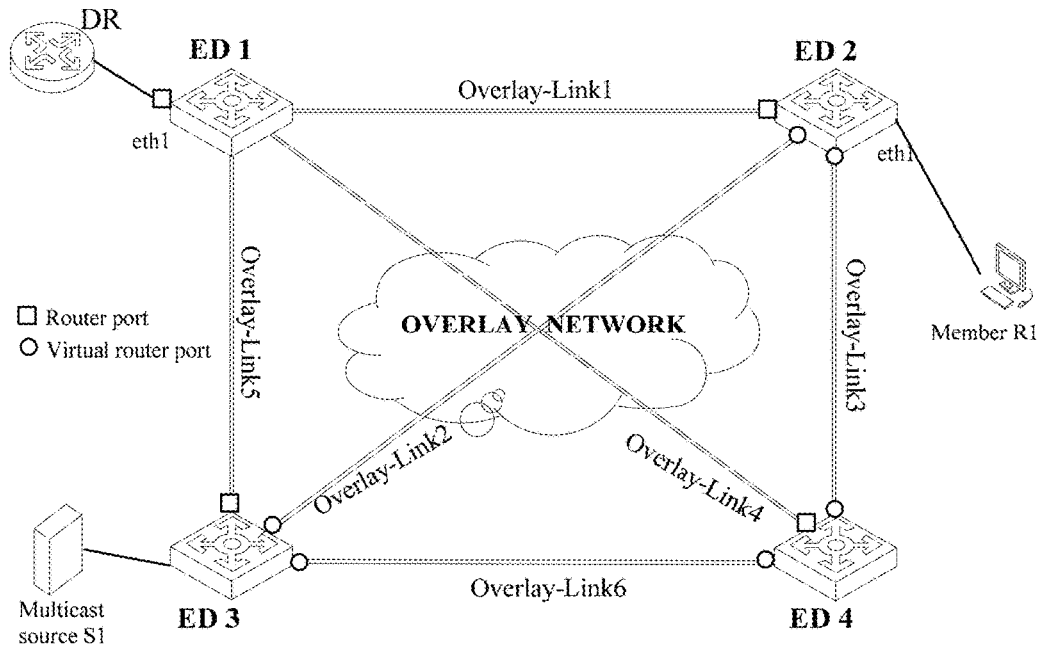
FIG. 1 is a schematic diagram illustrating a network in accordance with examples of the present disclosure.

FIG. 1 is a schematic diagram illustrating a network in accordance with examples of the present disclosure. ED1, ED2, ED3, ED4 are edge routers of the sites in an overlay network. An ED of a site is connected to devices within the site (referred to as the local site of the ED) via Ethernet ports. An ED is connected with other EDs via overlay virtual links such as tunnels. The ED may apply overlay encapsulation to a packet before the packet is sent to an overlay tunnel port. The packet after the overlay encapsulation is forwarded through the core network to an ED at the other end of the overlay virtual link. In this way, layer-2 interconnection between sites is implemented. Thus, as shown in FIG. 1 ED1 is connected to ED 2 by Overlay-Link 1, to ED4 by Overlay-Link4 and to ED3 by Overlay-Link5. ED2 is connected to ED3 by Overlay-Link2 and to ED4 by Overlay-Link3. ED4 is connected to ED3 by Overlay-Link 6. These links may be layer 2 tunnels over the layer 3 core network which connects the EDs of the various remotes sites.

FIG. 1 further shows a designated router (DR) which is a designated router which is to send a query packet of a multicast group to EDs. The DR is connected to ED1 by a port eth1 of the ED1. Multicast protocols may be used to set up a multicast tree in which ports from which an ED receives a query packet for a multicast group sent by the DR are known as router ports for that multicast group. For example, multicast source S1 of a multicast group is connected to ED3, and DR sends a query packet for the multicast group to ED1. ED1 records eth1 that received the query packet as a router port. Query packets are broadcast packets, and ED1 broadcasts the query packet to ED2, ED3 and ED4. After receiving the query packet, ED3 records the port on ED3 which connects ED3 to the EVI-Link5 to ED1 as a router port, ED2 records the port on ED2 which connects ED2 to the EVI-Link1 to ED1 as a router port, and ED4 records the port on ED4 which connects ED4 to the EVI-Link4 to ED1 as a router port. EDs have split horizon functions enabled to prevent forming loops in the overlay network. According to conventional split horizon techniques, an ED cannot forward packet received on one overlay tunnel port from an Overlay-Link through another overlay tunnel port to another Overlay-Link. Although the query packet is a broadcast packet, ED2, ED3 and ED4 cannot broadcast the query packet in the overlay network further due to restrictions of the split horizon functions. Therefore, router ports of the multicast group in the overlay network generated after the multicast group query process are shown in a box shape in FIG. 1.

A multicast group member is a device such as client device in one of the sites, which is joined to a multicast group such that it can receive multicasts. In accordance with the multicast protocols, after receiving a query packet from the DR, a multicast member may send membership report to the DR, over the multicast tree via the router ports.

However, a device may in some case be prevented from joining a multicast group that has a source in a different site of the overlay network which is not directly connected to the DR. Still in the example as shown in FIG. 1, ED2 may receive a membership report for the multicast group of S1 from member R1, and forward the membership report through the router port on ED2 to ED1 via Overlay-Link 1. According to the above query process, ED1 has a router port connected to the DR and no router port connected to ED3, thus cannot forward the membership report received from ED2 to ED3. Since ED3 cannot receive the membership report sent by member R1, ED3 cannot record a member port connected to ED2 in the direction towards R1, thus cannot send multicast traffic received from S1 to ED3. As such, member R1 cannot join the multicast group of S1, and cannot receive multicast traffic of the multicast group.

The present disclosure proposes a forwarding flag that allows a multicast related message, such as a query packet, that is received on an overlay tunnel port to be forwarded through another overlay tunnel port.

Figure 2:
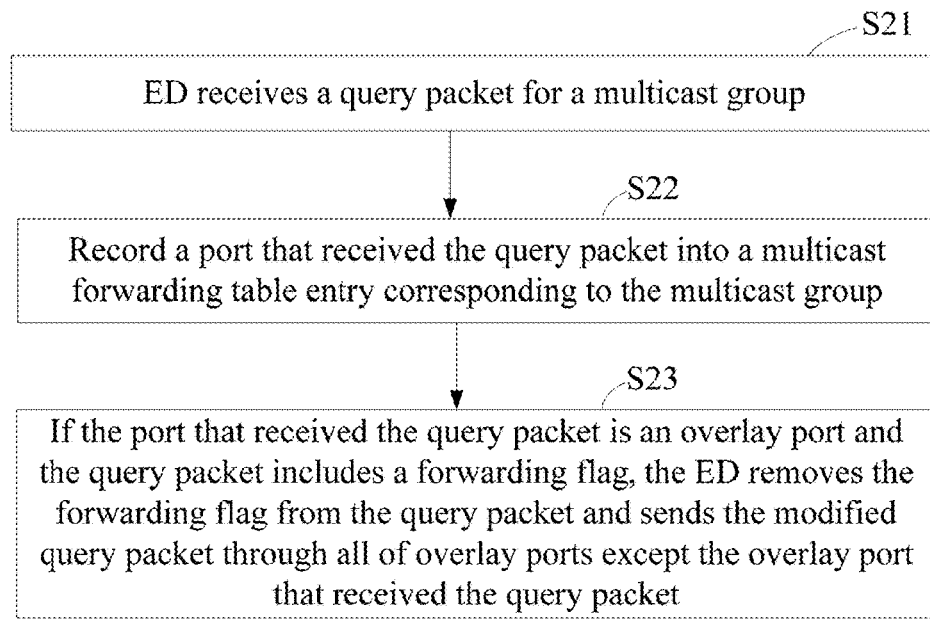
FIG. 2 is a flowchart illustrating a method of establishing multicast forwarding table entries in an overlay network in accordance with examples of the present disclosure.

FIG. 2 is a flowchart illustrating an example method of establishing multicast forwarding table entries in an overlay network in accordance with examples of the present disclosure. The method may include the following blocks.

At block S21, an ED receives a query packet for a multicast group. For example, the query packet may originate from the DR.

At block S22, the ED records a port that received the query packet into at least one list in a multicast forwarding table entry corresponding to the multicast group.

At block S23, if the port that received the query packet is an overlay tunnel port and the query packet includes a forwarding flag, the ED removes the forwarding flag from the query packet, and sends the modified query packet to all of overlay tunnel ports in a virtual local area network (VLAN) to which the query packet belongs except the overlay tunnel port that received the query packet. In the following description, packets are forwarded to ports in a VLAN to which the packet belongs, and the statement "in a VLAN to which the packet belongs" may sometimes be omitted in the context to make the description simple and concise.

In an example, the ED may apply overlay encapsulation to the query packet, and add a mark in an overlay header added to the query packet as the forwarding flag.

In an example, the ED may apply overlay-ISIS GRE encapsulation to the query packet, and set the value of a reserved field in an overlay header to be a preset value as the forwarding flag.

In an example, if the port that received the query packet is a port connected to a device in the local site, the ED may add a forwarding flag to the query packet, and send the modified query packet through all of overlay tunnel ports in a VLAN to which the query packet belongs.

In an example, the ED receives a membership report for the multicast group from a port connected to a device in the local site, and sends the membership report through all of overlay tunnel ports recorded in the at least one list in the multicast forwarding table entry corresponding to the multicast group.

As mentioned above, due to the split horizon function, membership reports sent by some EDs without direct connection with a designated router (DR) in the overlay network often cannot be forwarded to an ED connected with the multicast source when a conventional approach to overlay networking and split horizon function is used. Thus in a conventional approach members connected to these EDs cannot receive multicast packets. In contrast, the above process enables the ED connected with the multicast source to receive membership reports sent by each ED. As such, since EDs in an overlay network may form a full mesh network, the ED connected to the multicast source may record ports connected to all of the members so as to send multicast packets to the members. Thus multicast in an overlay network is implemented when all members in a multicast group can receive multicast packets for the multicast group.

In an example, the multicast forwarding table entry may include: a list of router ports and a list of virtual router ports. If the query packet received from an overlay tunnel port includes a forwarding flag, the port is referred to as a router port. Router ports are shown as a box shape port in FIG. 1. The ED may add the overlay tunnel port into the list of router ports corresponding to the multicast group. If the query packet received from an overlay tunnel port does not include a forwarding flag, the port is referred to as a virtual router port. Virtual router ports are shown as circle shaped ports in FIG. 1. The ED may add the overlay tunnel port into the list of virtual router ports corresponding to the multicast group. When receiving a query packet from a port connected to a device in the local site, the port is also a router port, and the ED may add the overlay tunnel port into the list of router ports corresponding to the multicast group.

In an example, the router ports and the virtual router ports corresponding to a multicast group may be recorded in one list. The ED may distinguish the router ports and the virtual ports using a marking mechanism, e.g., by adding a mark to a port recorded in the list specifying the port is a router port or a virtual router port.

A more detailed example will now be described with reference to FIG. 1. Supposing ED1 receives a query packet for a multicast group from a port eth1 connected to a device in the local site of ED1, ED1 may add a forwarding flag to the query packet and send the query packet through all overlay tunnel ports in a VLAN to which the query packet belongs, i.e., send the query packet to ED2, ED3 and ED4. Regarding ED3, the overlay tunnel port that received the query packet with the forwarding flag is a router port connected to ED1, thus the overlay tunnel port is added into a list of router ports corresponding to the multicast group.

After ED2 receives the query packet with the forwarding flag sent by ED1, ED2 may remove the forwarding flag in the query packet and send the query packet in which the forwarding flag has been removed through all of overlay tunnel ports in a VLAN to which the query packet belongs except the overlay tunnel port connected to ED1, i.e., send the query packet to ED3 and ED4. When ED3 receives the query packet without forwarding flag forwarded by ED2, the overlay tunnel port that received the query packet is the port connected to ED1, which is referred to as a virtual router port, and is added into a list of virtual router ports corresponding to the multicast group.

In an example, when an ED receives a membership report for a multicast group, the ED may send the membership report through all overlay tunnel ports recorded for the multicast group, i.e., ports in the list of router ports and ports in the list of virtual router ports. In the above example, ED3 records the overlay tunnel port connected with ED1 as a router port and the overlay tunnel ports respectively connected to ED2 and ED4 as virtual router ports after receiving the query packets. When receiving a membership report for the multicast group from the local site, ED3 may send the membership report through all ports recorded, i.e., all router ports and all virtual router ports recorded, in this example, through Overlay-Link5, Overlay-Link2 and Overlay-Link6.

Figure 3:
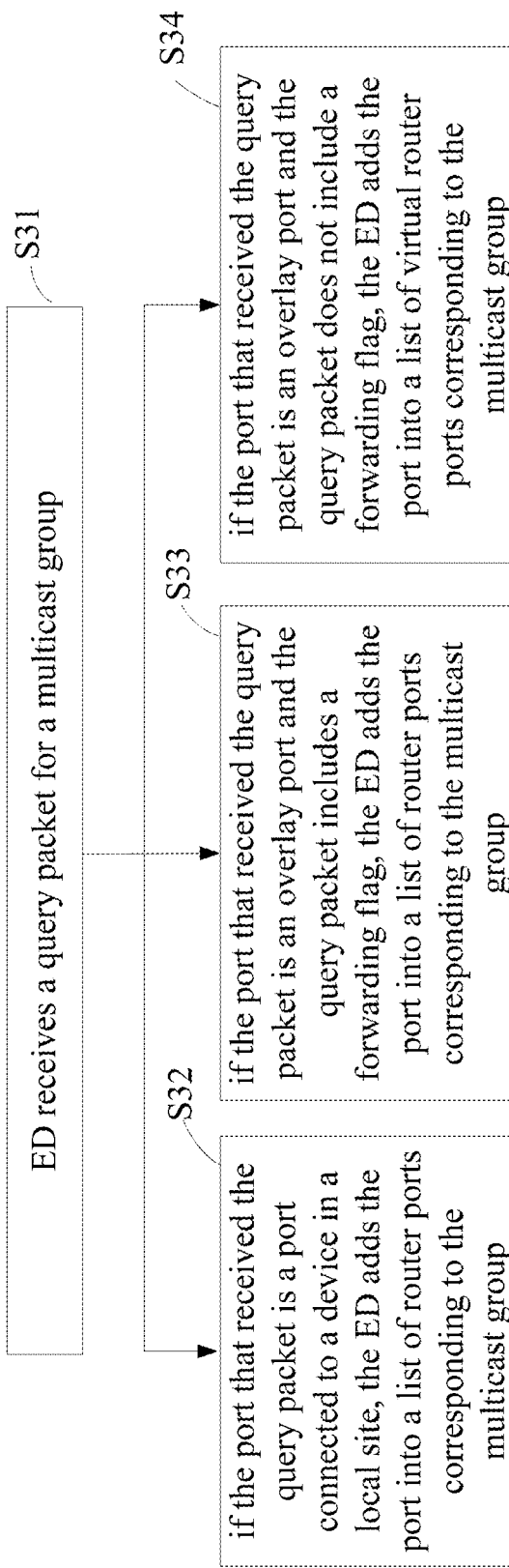
FIG. 3 is a flowchart illustrating a method of establishing multicast forwarding table entries in an overlay network in accordance with examples of the present disclosure.

FIG. 3 is a flowchart illustrating a method of establishing multicast forwarding table entries in an overlay network in accordance with examples of the present disclosure. The method may include the following blocks.

At block S31, an ED receives a query packet for a multicast group.

After receiving the query packet, if the port that received the query packet is a port connected to a device in a local site, the ED may perform the procedure in block S32; if the port that received the query packet is an overlay tunnel port and the query packet includes a forwarding flag, the ED may perform the procedure in block S33; if the port that received the query packet is an overlay tunnel port and the query packet does not include a forwarding flag, the ED may perform the procedure in block S34.

At block S32, if the port that received the query packet is a port connected to a device in a local site, the ED adds the port into a list of router ports corresponding to the multicast group.

In an example, after the procedure in block S32, the ED sends the query packet in which a forwarding flag is added through all overlay tunnel port in a VLAN to which the query packet belongs, and send the query packet without forwarding flag through ports connected to devices in the local site within the VLAN except the port that received the query packet.

At block S33, if the port that received the query packet is an overlay tunnel port and the query packet includes a forwarding flag, the ED adds the port into a list of router ports corresponding to the multicast group.

In an example, after the procedure in block S33, the ED may send the query packet from which the forwarding flag is removed through all ports in the VLAN to which the query packet belongs except the port that received the query packet.

At block S34, if the port that received the query packet is an overlay tunnel port and the query packet does not include a forwarding flag, the ED adds the port into a list of virtual router ports corresponding to the multicast group.

In an example, after the procedure in block S34, the ED may forward the query packet through ports connected to devices in the local site within the VLAN to which the query packet belongs. In an example, after receiving the query packet that does not include a forwarding flag, the ED may not forward the query packet through ports connected to devices in the local site.

In an example, after establishing the list of router ports and the list of virtual router ports, the ED receives a membership report for the multicast group, adds a port that received the membership report into a list of member ports corresponding to the multicast group. If the port that received the membership report is a port connected to a device in the local site, the ED may forward the membership report through ports recorded in the list of router ports and the list of virtual router ports corresponding to the multicast group. If the port that received the membership report is an overlay tunnel port, the ED may forward the membership report through ports connected to devices in the local site in the VLAN to which the membership report belongs.

When receiving a multicast packet from a multicast source, the ED may forward the multicast packet through all of member ports and router ports, e.g., ports recorded in the list of router ports and the list of member ports, or ports that are marked as router ports in the list, so that the multicast packet is forwarded to members of the multicast group to implement multicast in an overlay network.

As such, the method of various examples implements multicast in an overlay network having the split horizon function by establishing multicast forwarding table entries.

Figure 4:
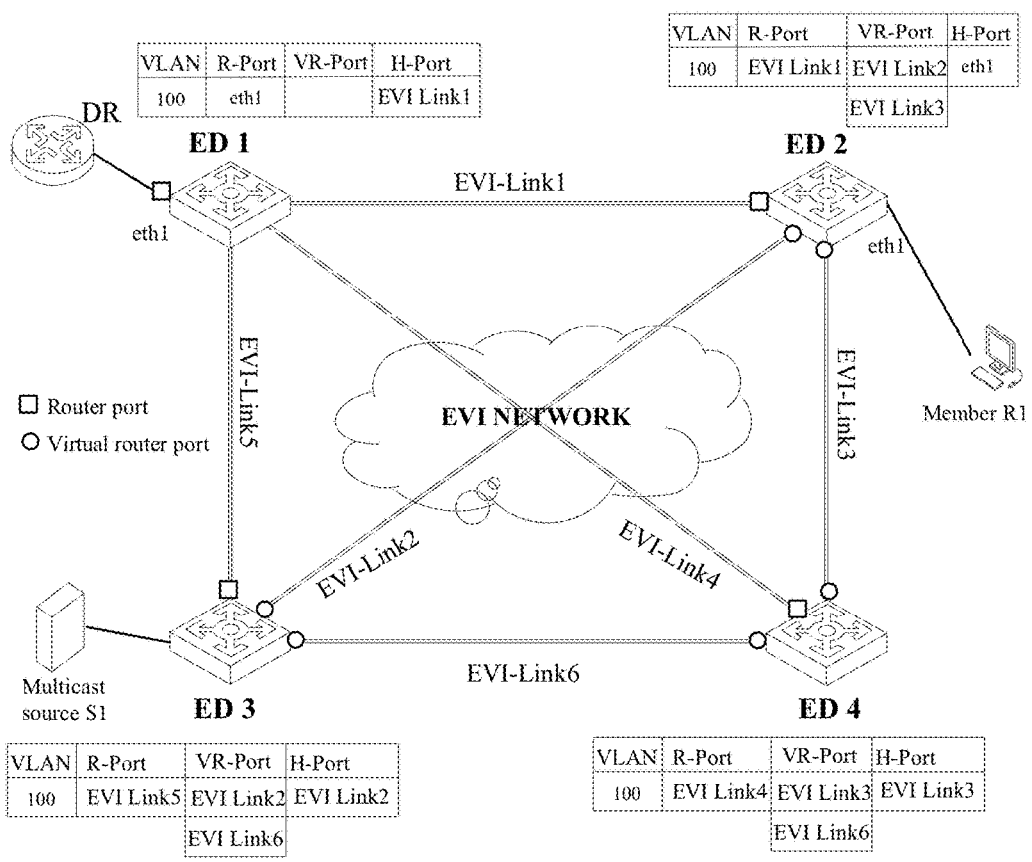
FIG. 4 is a schematic diagram illustrating a network in accordance with examples of the present disclosure.

FIG. 4 is a schematic diagram illustrating a network in accordance with examples of the present disclosure. In FIG. 4, the multicast source and multicast members are connected to different EDs in an EVI network. In addition, in this example, an ED is connected to a device in the local site through an Ethernet port. In FIG. 4, EVI is merely an example of overlay method, and may be substituted with other overlay methods.

ED1 receives a query packet for a multicast group sent by an IGMP querier via a DR. The port received the query packet is an Ethernet port denoted as eth1, and the VLAN to which the query packet belongs is VLAN100. ED1 adds eth1 into a list of router ports denoted as R-Port corresponding to the multicast group, and forwards the query packet through all ports in VLAN100 except the port that received the query packet, i.e., eth1.

Query packets to be sent through Ethernet ports connected to devices in the local site are not to be modified before forwarded through the Ethernet ports.

Query packets to be forwarded through EVI tunnel ports may be processed through GRE tunnel encapsulation and the forwarding flags are added, thus a remote ED at the other end of the tunnel may forward the query packet via EVI tunnels after receiving the query packet with a forwarding flag.

In an example, when processing the query packet through GRE encapsulation, ED1 may modify the value of a reserved field in an EVI header from "0000" to be "0100" which serves as the forwarding flag in the query packet. Then ED1 forwards the query packet having the forwarding flag through EVI tunnel ports of EVI-Link1, EVI-Link4 and EVI-Link5.

When ED2, ED3 and ED4 receive the query packet from respective EVI tunnel ports, and find the query packet includes a forwarding flag, ED2, ED3 and ED4 add respective EVI tunnel ports into respective list of router ports corresponding to the multicast group, remove the forwarding flag from the query packet, and forward the query packet without forwarding flag through all of ports in VLAN100 except the port that received the query packet.

The query packet is decapsulated before forwarded to the Ethernet ports connected to devices in the local site. Since the decapsulation of the query packet received from the EVI tunnel port also removes the forwarding flag in the query packet, the decapsulated query packet is then forwarded through Ethernet ports connected to devices in the local site in VLAN100.

When forwarding the query packet through an EVI tunnel port, the ED may apply GRE tunnel encapsulation to the decapsulated query packet without adding a forwarding flag, which is equivalent to removing the forwarding flag from the query packet, and forward the query packet from which the forwarding flag is removed through the EVI tunnel port.

In an example, ED2 receives the query packet from the EVI tunnel port EVI-Link1 and decapsulates the query packet. ED2 identifies that the value of the "Reserved" field in the EVI header is "0100", thus adds the port that received the query packet, i.e., EVI-Link1, into a list of router ports corresponding to the multicast group, and forwards the query packet through all of ports in VLAN100 except the port that received the query packet. When forwarding the query packet through Ethernet port eth1, ED2 forwards the decapsulated query packet through eth1. When forwarding the query packet through an EVI tunnel port, ED2 recovers the value of the "Reserved" field in an EVI header to be the default value of "0000" when performing GRE encapsulation on the query packet, i.e., removing the forwarding flag from the query packet. The query packet after the GRE encapsulation is flooded through unicast to ED3 and ED4 via EVI tunnel ports EVI-Link2 and EVI-Link3 respectively.

Likewise, ED3 receives a query packet from the EVI tunnel port of EVI-Link5 and decapsulates the query packet. ED5 finds the value of the "Reserved" field in the EVI header is "0100", thus adds the port that received the query packet, i.e., EVI-Link5, into a list of router ports corresponding to the multicast group, and forwards the query packet through all of ports in VLAN100 except the port that received the query packet. When forwarding the query packet through an EVI tunnel port, ED3 recovers the value of the "Reserved" field in the EVI header to be the default value "0000" when performing GRE encapsulation on the query packet, i.e., removing the forwarding flag from the query packet. The query packet after the GRE encapsulation is flooded through unicast to ED2 and ED4 via EVI tunnel ports EVI-Link2 and EVI-Link6 respectively.

Likewise, ED4 receives a query packet from the EVI tunnel port of EVI-Link4 and decapsulates the query packet. ED5 identifies the value of the "Reserved" field in the EVI header is "0100", thus adds the port that received the query packet, i.e., EVI-Link4, into a list of router ports corresponding to the multicast group, and forwards the query packet through all of ports in VLAN100 except the port that received the query packet. When forwarding the query packet through an EVI tunnel port, ED4 recovers the value of the "Reserved" field in the EVI header to be the default value "0000" when performing GRE encapsulation on the query packet, i.e., removing the forwarding flag from the query packet. The query packet after the GRE encapsulation is flooded through unicast to ED2 and ED3 via EVI tunnel ports EVI-Link3 and EVI-Link6 respectively.

When ED2, ED3 and ED4 receive a query packet without forwarding flag from respective EVI tunnel ports, ED2, ED3 and ED4 add respective ports that received the query packet into respective lists of virtual router ports corresponding to the multicast group, and forward the query packet through Ethernet ports in VLAN100. In an example, ED2, ED3 and ED4 may not forward the query packets through the Ethernet ports connected to devices in respective local sites.

In an example, ED3 and ED4 receive query packets from respective EVI tunnel ports EVI-Link2 and EVI-Link3 forwarded by ED2 through EVI tunnels, decapsulate the query packet, identify that the value of the "Reserved" field in the EVI header of the query packet is "0000", i.e., the query packet does not include a forwarding flag, thus respectively add EVI tunnel ports EVI-Link2 and EVI-Link3 into respective lists of virtual router ports (VR-Port) corresponding to the multicast group in ED3 and ED4. Since the value of the "Reserved" field in the EVI header of the query packet is "0000", i.e., the query packet does not include a forwarding flag, the query packet is not forwarded through any EVI tunnel port. ED3 and ED4 forward the query packet through Ethernet ports in VLAN100.

Likewise, ED2 and ED4 receive query packets from respective EVI tunnel ports EVI-Link2 and EVI-Link6 forwarded by ED3 through EVI tunnels, decapsulate the query packet, identify the value of the "Reserved" field in the EVI header of the query packet is "0000" which indicates the query packet does not include a forwarding flag, and respectively add EVI tunnel ports EVI-Link2 and EVI-Link6 into a list of virtual router ports corresponding to the multicast group in ED2 and ED4. Since the value of the "Reserved" field in the EVI header of the query packet is "0000" which indicates the query packet does not include a forwarding flag, the query packet is not forwarded through any EVI tunnel port. ED2 and ED4 forward the query packet through Ethernet ports in VLAN100.

Likewise, ED2 and ED3 receive query packets from respective EVI tunnel ports EVI-Link3 and EVI-Link6 forwarded by ED4 through EVI tunnels, decapsulate the query packet, identify that the value of the "Reserved" field in the EVI header of the query packet is "0000" which indicates the query packet does not include a forwarding flag, and respectively add EVI tunnel ports EVI-Link3 and EVI-Link6 into a list of virtual router ports corresponding to the multicast group in ED2 and ED3. Since the value of the "Reserved" field in the EVI header of the query packet is "0000" which indicates the query packet does not include a forwarding flag, the query packet is not forwarded through any EVI tunnel port. ED2 and ED3 forward the query packet through Ethernet ports in VLAN100.

After receiving a membership report indicating a member R1 joins the multicast group, ED2 adds a port that received the membership report into a list of member ports (H-Port) corresponding to the multicast group, and forwards the membership report through ports recorded in the list of router ports and the list of virtual router ports corresponding to the multicast group.

In an example, ED2 receives a membership report sent by a member from an Ethernet port eth1, obtains the address of a multicast group to be joined by the host from the membership report, adds the port that received the membership report, i.e., eth1, into a list of member ports corresponding to the multicast group, applies GRE encapsulation to the membership report, and sends the membership report through EVI tunnel ports EVI-Link1 recorded in the list of router ports, and EVI-Link 2 and EVI-Link3 recorded in the virtual router ports corresponding to the multicast group.

ED1, ED3 and ED4 receive the membership report forwarded by ED2, add respective EVI tunnel ports, i.e., EVI link1, EVI-Link2 and EVI-Link3, into a list of member ports corresponding to the multicast group. The membership report will not be forwarded further through EVI tunnel ports due to the split horizon function, and is only forwarded through Ethernet ports connected to devices in a local site.

When receiving a multicast packet sent by the multicast source, ED3 forwards the multicast packet to an ED connected to a member according to the list of router ports and the list of member ports corresponding to the multicast group.

In an example, ED3 may apply GRE encapsulation to the multicast packet sent by a multicast source S1, and forward the multicast packet to ED2 via a port recorded in the list of member ports corresponding to the multicast group in ED3, i.e., EVI-Link2. ED2 receives the multicast packet, performs GRE decapsulation, and forwards the multicast packet to member R1 via the port eth1 recorded in the list of member ports corresponding to the multicast group in ED2.

Hence, the process of forwarding multicast packets in an EVI network is implemented.

Figure 5:
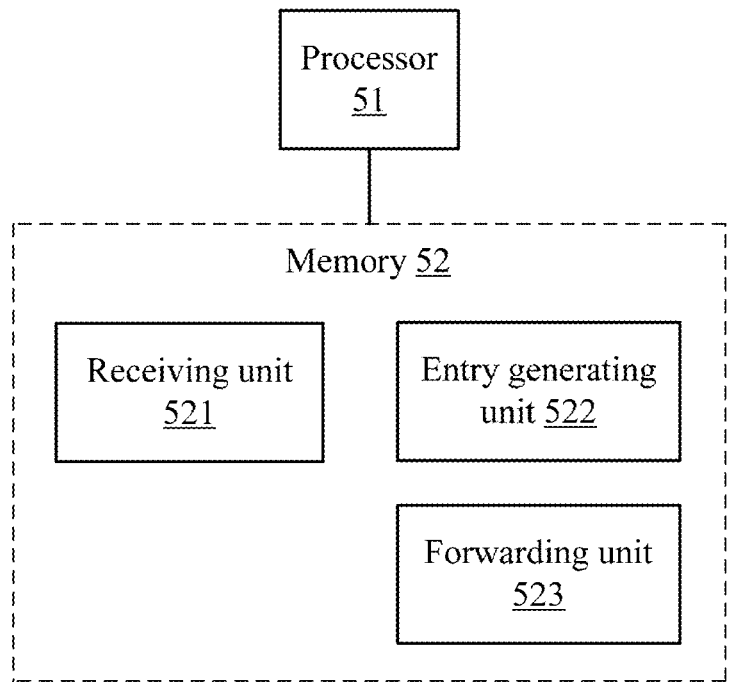
FIG. 5 is a schematic diagram illustrating a structure of an ED in accordance with examples of the present disclosure.

Various examples also provide an edge device in an overlay network. As shown in FIG. 5, the edge device may include a processor 51 and a memory 52. The memory 52 may store multiple units each including a series of machine-executable instructions. The processor 51 may perform actions specified by the machine-executable instructions.

In an example, the memory 52 may include: a receiving unit 521, an entry generating unit 522 and a forwarding unit 523.

The instructions in the receiving unit 521 are to receive a query packet for a multicast group.

The instructions in the entry generating unit 522 are to record a port that received the query message into at least one list of a multicast forwarding table entry corresponding to the multicast group.

The instructions in the forwarding unit 523 are to remove the forwarding flag from the query packet and send the query packet in which the forwarding flag has been removed through all of overlay tunnel ports in a VLAN to which the query packet belongs, except the overlay tunnel port that received the query packet, if the port that received the query packet is an overlay tunnel port and the query packet includes a forwarding flag.

In an example, the processor 51 reads instructions in the forwarding unit 523 to execute: adding a forwarding flag into the query packet and sending the query packet in which the forwarding flag has been added through all of overlay tunnel ports in a VLAN to which the query packet belongs if the port that received the query packet is a port connected to a device in a local site.

In an example, the processor 51 reads instructions in the receiving unit 521 to execute: receiving a membership report for the multicast group from a port connected with a device in the local site. The processor 51 reads instructions in the forwarding unit 523 to execute: sending the membership report through all overlay tunnel ports recorded in the at least one list in the multicast forwarding table entry corresponding to the multicast group.

In an example, the processor 51 reads instructions in the forwarding unit 523 to execute: processing the query packet through overlay encapsulation, and adding a mark into an overlay header of the query packet as the forwarding flag.

In an example, the processor 51 reads instructions in the forwarding unit 523 to execute: processing the query packet through overlay-ISIS GRE encapsulation, and setting the value of a reserved field in the overlay header to be a preset value as the forwarding flag.

In an example, the multicast forwarding table entry may include: a list of router ports and a list of virtual router ports. The processor 51 reads instructions in the entry generating unit 522 to execute: adding the overlay tunnel port into the list of router ports corresponding to the multicast group if the port that received the query packet is an overlay tunnel port and the query packet includes a forwarding flag; adding the overlay tunnel port into the list of virtual router ports corresponding to the multicast group if the port that received the query packet is an overlay tunnel port and the query packet does not include a forwarding flag.

In an example, the processor 51 reads instructions in the forwarding unit 523 to execute: sending a membership report for the multicast group received from a port connected to a device in a local site through all of ports recorded in the list of router ports and the list of virtual router ports corresponding to the multicast group.

Figure 6:
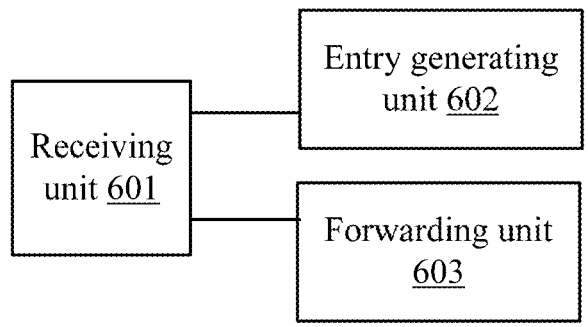
FIG. 6 is a schematic diagram illustrating a structure of an ED in accordance with examples of the present disclosure.

Various examples also provide an edge device as shown in FIG. 6. The ED may include the following units.

A receiving unit 601 is to receive a query packet for a multicast group.

An entry generating unit 602 is to add a port that received the query packet into a list of router ports corresponding to the multicast group if the port is a port connected to a device in a local site.

The entry generating unit 602 is to add the port that received the query packet into the list of router ports corresponding to the multicast group if the port is an overlay tunnel port and the query packet includes a forwarding flag.

The entry generating unit 602 is to add the port that received the query packet into the list of virtual router ports corresponding to the multicast group if the port is an overlay tunnel port and the query packet does not include a forwarding flag.

The device may also include a forwarding unit 603.

If the port that received the query packet is a port connected to a device in the local site, the forwarding unit 603 is to sent the query packet in which a forwarding flag has been added through all of overlay tunnel ports in a VLAN to which the query packet belongs; and to send the query packet in which no forwarding flag is added through all ports connected to devices in the local site in the VLAN except the port that received the query packet.

If the port that received the query packet is an overlay tunnel port and the query packet includes a forwarding flag, the forwarding unit 603 is to send the query packet in which the forwarding flag has been removed through all ports in the VLAN to which the query packet belongs except the port that received the query packet.

If the port that received the query packet is an overlay tunnel port and the query packet does not include a forwarding flag, the forwarding unit 603 is to send the query packet through ports connected to devices in the local site in the VLAN to which the query packet belongs.

In an example, the receiving unit 601 is also to receive a membership report for the multicast group. The entry generating unit 602 is to add a port that received the membership report into a list of member ports corresponding to the multicast group.

If the port that received the membership report is a port connected to a device in the local site, the forwarding unit 603 is to forward the membership report through ports recorded in the list of router ports and the list of virtual router ports corresponding to the multicast group.

If the port that received the membership report is an overlay tunnel port, the forwarding unit 603 is to forward the membership report through ports connected to devices in the local site within a VLAN to which the membership report belongs.

It should be understood that in the above processes and structures are examples only and in other examples certain procedures or modules may not be included. The order of the procedures is not fixed, and can be adjusted. Each module and/or unit may be implemented by a single module, or by multiple sub-modules, and functions of multiple modules may be implemented by the same module. The modules may reside in the same device or distribute in different devices. The "first", "second" in the above descriptions are merely for distinguishing two similar objects, and have no substantial meanings.

In various embodiments, a module may be implemented as a hardware module, by a processor executing machine-executable instructions stored in a memory or a combination of both. For example, a hardware module may include a hardware processor comprising dedicated circuitry or logic that is permanently configured (e.g., as a special-purpose processor, such as a field programmable gate array (FPGA) or an application-specific integrated circuit (ASIC)) to perform certain operations. In other examples a module may be implemented by a general purpose processor, such as a central processing unit that is to execute machine readable instructions stored in a non-transitory machine readable storage medium. A module may be implemented by a combination of these approaches. Furthermore, a module may be implemented by a single processor or by a plurality of distributed components. Thus the term processor as used in the description and claims should be interpreted as including a single processor, or a plurality of processors such as a central processing unit, FPGA, ASIC etc.

A machine-readable storage medium is also provided, which is to store instructions executable by a machine to implement the method of various examples. Specifically, a system or apparatus may have a storage medium which stores machine-readable program codes for implementing functions of any of the above examples. A computing device (or a CPU or an MPU) in the system or the apparatus may read and execute the program codes stored in the storage medium. In addition, the program codes may cause an operating system running in a computer to implement part or all of the operations. In addition, the program codes may be read out from a storage medium and be written in a storage device in an extension board inserted in the computer or in a storage device in an extension unit connected to the computer. In this example, a CPU in the extension board or the extension unit executes at least part of the operations according to the instructions of the program codes to realize the technical mechanism of any of the above examples.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

The invention claimed is:

1. A method of establishing multicast forwarding table entries in an overlay network, comprising:
   receiving, by an edge device (ED), a query packet for a multicast group;
   recording, by the ED, a port that received the query packet into at least one list in a multicast forwarding table entry corresponding to the multicast group;
   if the port that received the query packet is an overlay tunnel port and the query packet includes a forwarding flag, removing, by the ED, the forwarding flag in the query packet to create a modified query packet, and sending the modified query packet to all of overlay tunnel ports in a virtual local area network (VLAN) to which the query packet belongs except the overlay tunnel port that received the query packet, and
   wherein the recording, by the ED, the port that received the query packet comprises:
      if the port that received the query packet is an overlay tunnel port and the query packet includes a forwarding flag, adding the overlay tunnel port into a list of router ports corresponding to the multicast group; and
      if the port that received the query packet is an overlay tunnel port and the query packet does not include a forwarding flag, adding the overlay tunnel port into a list of virtual router ports corresponding to the multicast group.

2. The method of claim 1, further comprising:
   if the port that received the query packet is a port connected to a device in a local site, adding, by the ED, a forwarding flag into the query packet, and sending the query packet in which the forwarding flag has been added through all of overlay tunnel ports in the VLAN to which the query packet belongs.

3. The method of claim 1, further comprising:
   receiving, by the ED, a membership report for the multicast group from a port connected to a device in a site where the ED belongs, and sending the membership report through all of overlay tunnel ports recorded in the at least one list in the multicast forwarding table entry corresponding to the multicast group.

4. The method of claim 1, further comprising:
   receiving, by the ED, a membership report for the multicast group from a port connected to a device in a site where the ED belongs, and sending the membership report through all of ports recorded in the list of router ports and the list of virtual router ports.

5. An edge device (ED) in an overlay network, comprising a processor and a non-transitory storage medium storing machine readable instructions that are executable by the processor to:
   receive a query packet for a multicast group;
   record a port that received the query packet into at least one list in a multicast forwarding table entry corresponding to the multicast group;
   add an overlay tunnel port that received the query packet into a list of router ports corresponding to the multicast group if the port that received the query packet is an overlay tunnel port and the query packet includes a forwarding flag;
   add the overlay tunnel port that received the query packet into a list of virtual router ports corresponding to the multicast group if the port that received the query packet is an overlay tunnel port and the query packet does not include a forwarding flag; and
   remove a forwarding flag in the query packet to create a modified query packet and send the modified query packet to all of overlay tunnel ports in a virtual local area network (VLAN) to which the query packet belongs except an overlay tunnel port that received the query packet if the port that received the query packet is an overlay tunnel port and the query packet includes a forwarding flag.

6. The ED of claim 5, wherein the instructions that are executable by the processor to:
   add a forwarding flag into the query packet and sending the query packet in which the forwarding flag has been added through all of overlay tunnel ports in the VLAN to which the query packet belongs if the port that received the query packet is a port connected to a device in a local site.

7. The ED of claim 6, wherein the instructions that are executable by the processor to:
   receive a membership report from a port connected to a device in the local site; and
   send the membership report through all of overlay tunnel ports recorded in the at least one list in the multicast forwarding table entry corresponding to the multicast group.

8. The ED of claim 5, wherein the instructions that are executable by the processor to:
   send a membership report received from a device in a site where the ED belongs through all of ports recorded in the list of router ports and the list of virtual router ports corresponding to the multicast group.

* * * * *